United States Patent
Enarson et al.

[11] Patent Number: 6,115,201
[45] Date of Patent: Sep. 5, 2000

[54] DISC DRIVE HEAD BIAS CURRENT OPTIMIZATION

[75] Inventors: Karl Louis Enarson, Yukon; Deanne Sue Grover; Hieu Van Nguyen, both of Oklahoma City; John Michael Baker, Tuttle, all of Okla.

[73] Assignee: Seagate Technology, Inc., Scotts Valley, Calif.

[21] Appl. No.: 09/040,667

[22] Filed: Mar. 18, 1998

Related U.S. Application Data

[60] Provisional application No. 60/062,415, Oct. 16, 1997.

[51] Int. Cl.[7] ........................................... G11B 5/03
[52] U.S. Cl. ............................................... 360/66
[58] Field of Search .................. 360/46, 66, 67, 360/53

[56] References Cited

U.S. PATENT DOCUMENTS

| | | |
|---|---|---|
| 4,799,112 | 1/1989 | Bremmer et al. . |
| 5,262,907 | 11/1993 | Duffy et al. . |
| 5,276,662 | 1/1994 | Shaver, Jr. et al. . |
| 5,550,502 | 8/1996 | Aranovsky . |
| 5,631,999 | 5/1997 | Dinsmore . |
| 5,719,719 | 2/1998 | Tsuyoshi et al. ........................ 360/66 |
| 5,774,291 | 6/1998 | Contreras et al. ...................... 360/66 |
| 5,831,782 | 11/1998 | Kohno et al. ............................ 360/66 |

Primary Examiner—W. Chris Kim
Attorney, Agent, or Firm—Crowe & Dunlevy

[57] ABSTRACT

An apparatus and method are disclosed for determining a maximum magnitude of bias current that can be safely applied to a head of a disc drive. The disc drive comprises a head disposed adjacent a rotatable disc having a recording surface on which data are magnetically stored, a preamplifier circuit which selectively applies bias currents to the head, and a head bias current selection circuit, operably coupled to the preamplifier circuit, which first determines the maximum magnitude of bias current that can be applied to the head in relation to a maximum power dissipation rating of the head and voltage measured across the head when at least one initial bias current of selected magnitude is applied to the head. Thereafter, a range of bias currents having different magnitudes less than or equal to the maximum magnitude are selected and evaluated to select an optimum magnitude for subsequent use by the drive.

19 Claims, 5 Drawing Sheets

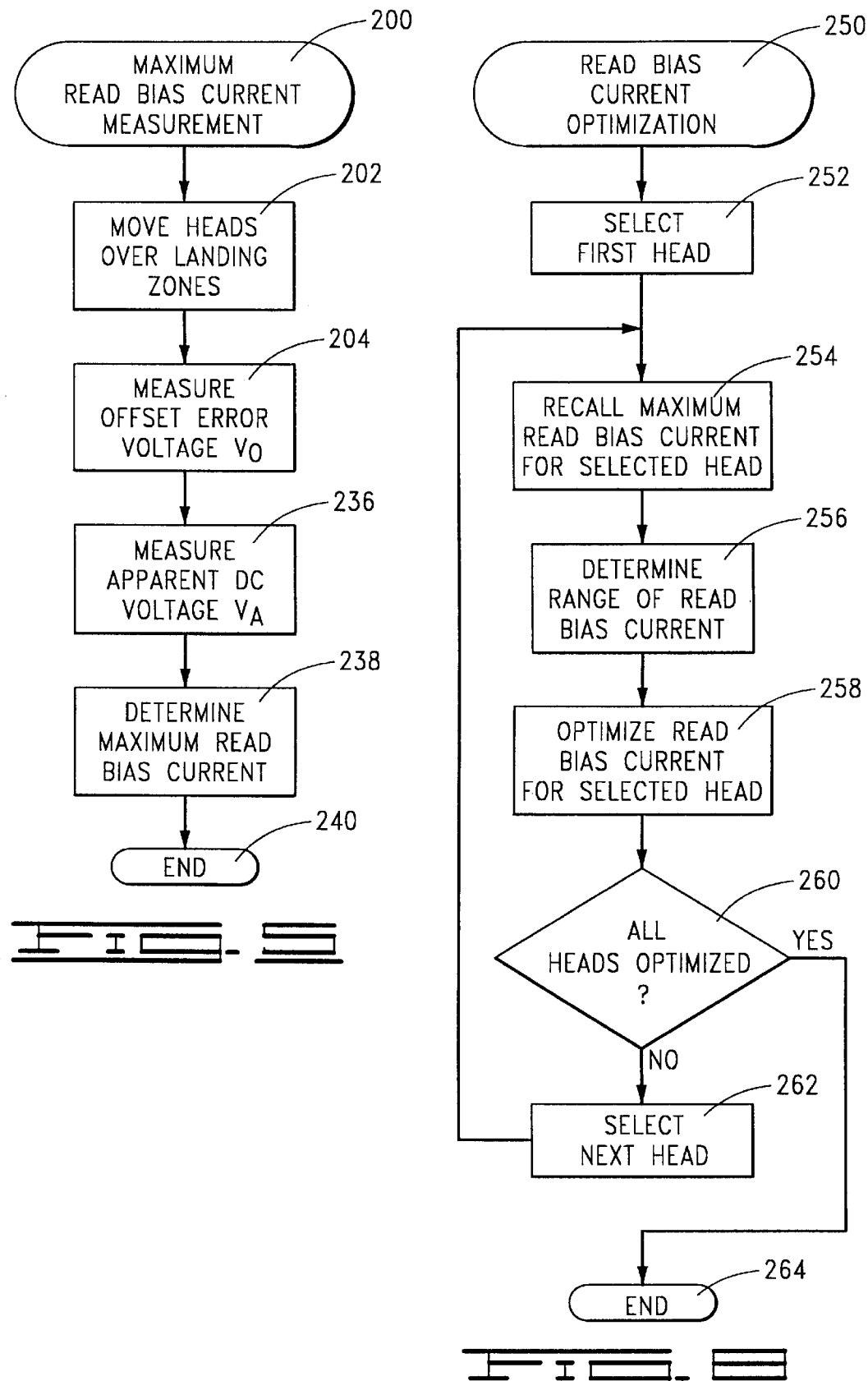

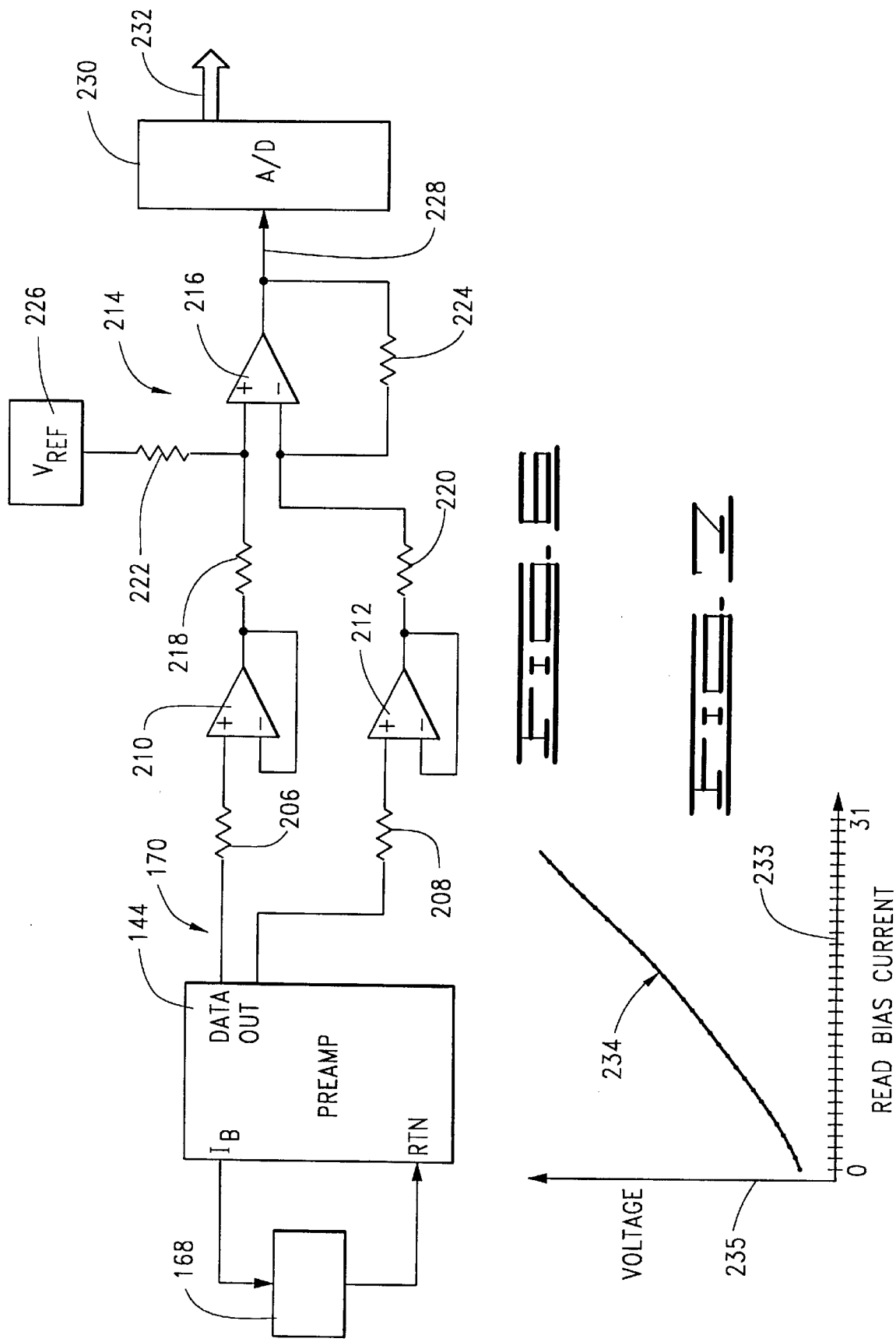

DISC DRIVE HEAD BIAS CURRENT OPTIMIZATION

RELATED APPLICATIONS

This application claims the benefit of U.S. Provisional Application Ser. No. 60/062,415 entitled MAGNETORESISTIVE HEAD RESISTANCE MEASUREMENT USED IN ADAPTIVE READER BIAS, filed Oct. 16, 1997.

FIELD OF THE INVENTION

The present invention relates generally to the field of disc drive data storage devices and more particularly, but without limitation, to a method and apparatus for determining the maximum head bias current that can be safely applied to a disc drive head.

BACKGROUND

Hard disc drives are used in modern computer systems and computer networks to enable users to quickly access vast amounts of electronically stored data. A typical disc drive houses five to ten magnetic discs which are axially aligned and mounted to a spindle motor for rotation at a constant, high speed. An array of read/write heads are controllably positioned adjacent magnetic recording surfaces of the discs in order to store and retrieve the data from tracks defined on the disc surfaces. The heads fly adjacent the recording surfaces on air bearings established by air currents set up by the rotation of the discs.

Of particular interest are heads of the so-called "magneto-resistive" variety, which utilize magneto-resistive (MR) elements to sense the selective magnetization of the tracks during disc drive data transfer operations. A typical MR element is formed from an alloy of materials so as to have a baseline electrical resistance which varies in the presence of a magnetic field of a selected orientation. By passing a bias current through the MR element, the selective magnetization of a corresponding track can be determined in relation to variations in voltage detected across the MR element.

It is common in present generation disc drive manufacturing processes to individually select read bias current magnitudes for each of the MR heads of a disc drive in order to optimize disc drive performance. For example, test data are typically written and then read in turn a number of times using a range of different read bias current magnitudes. Those read bias current magnitudes providing optimum performance are then stored in memory utilized by the drive so that, when a particular head is selected during subsequent operation, the disc drive applies the appropriate read bias current to the particular head.

MR heads are known to be delicate and must be handled and operated with a certain degree of care so as to prevent inadvertent damage which can degrade the reliability of the heads. Although the application of a relatively larger bias current will generally enhance the sensitivity of an MR head during a read operation, by providing a higher signal to noise ratio in a recovered readback signal, it is important to ensure that the maximum power dissipation capability of the head is not exceeded. As will be recognized, because the MR element operates as a (highly sensitive) resistance, the power P dissipated by the MR element will be generally proportional to the resistance R of the MR element multiplied by the square of the bias current I (i.e., $P=I^2R$). Accordingly, there is an upper limit on the magnitude of the bias current that can be applied to any given MR head, and the application of too large a bias current, even momentarily, can stress the MR head and adversely affect its operational reliability over time.

Accordingly, there remains a continual need for improvements in the art whereby the reliability of a disc drive can be maintained by ensuring that head bias currents do not exceed the power dissipation capabilities of the heads of the disc drive.

SUMMARY OF THE INVENTION

The present invention is directed to an apparatus and method for optimizing magnitude of a bias current applied to a head of a disc drive.

In accordance with a preferred embodiment, the head is disposed adjacent a rotatable disc having a recording surface on which data are magnetically stored. A preamplifier circuit selectively applies bias currents to the head in response to a head bias current selection circuit (such as a control processor having associated memory). Preferably, the head is characterized as a magneto-resistive head and the bias currents are read bias currents which are applied by the preamplifier circuit to a magneto-resistive read element of the head.

In order to optimize the magnitude of the bias current, the maximum magnitude that can be safely applied to the head is first determined. This is accomplished by measuring a voltage across the head in response to the application of an initial bias current of selected magnitude. The maximum magnitude of bias current is next determined in relation to the voltage measured across the head and a maximum power dissipation rating of the head. Preferably, multiple bias currents having incrementally increasing magnitudes are sequentially applied and corresponding voltages are measured, and the maximum magnitude of bias current is determined therefrom.

Next, to arrive at an optimized magnitude of the bias current, a range of bias currents is identified comprising a plurality of bias currents of different magnitudes, each magnitude being equal to or less than the previously determined maximum magnitude. Each of the plurality of bias currents from the range of bias currents is then sequentially applied to the head and the resulting performance of the disc drive is evaluated, with the optimized magnitude of the bias current being selected therefrom on the basis of that magnitude of bias current providing optimum disc drive performance.

Preferably, the voltage across the head is measured when the head is disposed beyond the recording surface of the disc so that data stored on the disc do not interfere with the voltage measurement. Further, the voltage across the head is preferably characterized as the actual direct current (DC) voltage across the head, so that the effects of voltage offset errors introduced by the preamplifier circuit are removed.

Moreover, the voltages are provided to an analog-to-digital (A/D) converter so as to be expressed in digital form. A unity gain buffer can be advantageously used to electrically isolate the preamplifier circuit from noise generated by the A/D converter.

These and various other features as well as advantages which characterize the present invention will be apparent from a reading of the following detailed description and a review of the associated drawings.

BRIEF DESCRIPTION OF THE DRAWINGS

FIG. 5 is a flow chart illustrating the general steps performed in accordance with a MAXIMUM READ BIAS CURRENT MEASUREMENT routine used to determine a maximum read bias current for each of the heads of the disc drive. The routine of FIG. 5 is representative of programming stored in the flash memory device of FIG. 2 and utilized by the control processor of FIG. 2 in accordance with a preferred embodiment of the present invention.

FIG. 6 provides a schematic diagram of a circuit used during the operation of the routine of FIG. 5, and includes the preamplifier circuit of FIG. 3, the MR read element of FIG. 4, as well as an analog-to-digital (A/D) converter, a unity gain buffer and a differential amplifier.

FIG. 7 graphically illustrates the general relationship between voltages measured across a selected head and a series of sequentially applied read bias currents of incrementally increasing magnitude.

FIG. 8 is a flow chart illustrating the general steps performed in accordance with a READ BIAS CURRENT OPTIMIZATION routine used to select an optimum head bias current for each of the heads of the disc drive, using the maximum read bias currents determined by the routine of FIG. 5. The routine of FIG. 8 is representative of programming stored in the flash memory device of FIG. 2 and utilized by the control processor of FIG. 2 in accordance with a preferred embodiment of the present invention.

DETAILED DESCRIPTION

Figure 1:
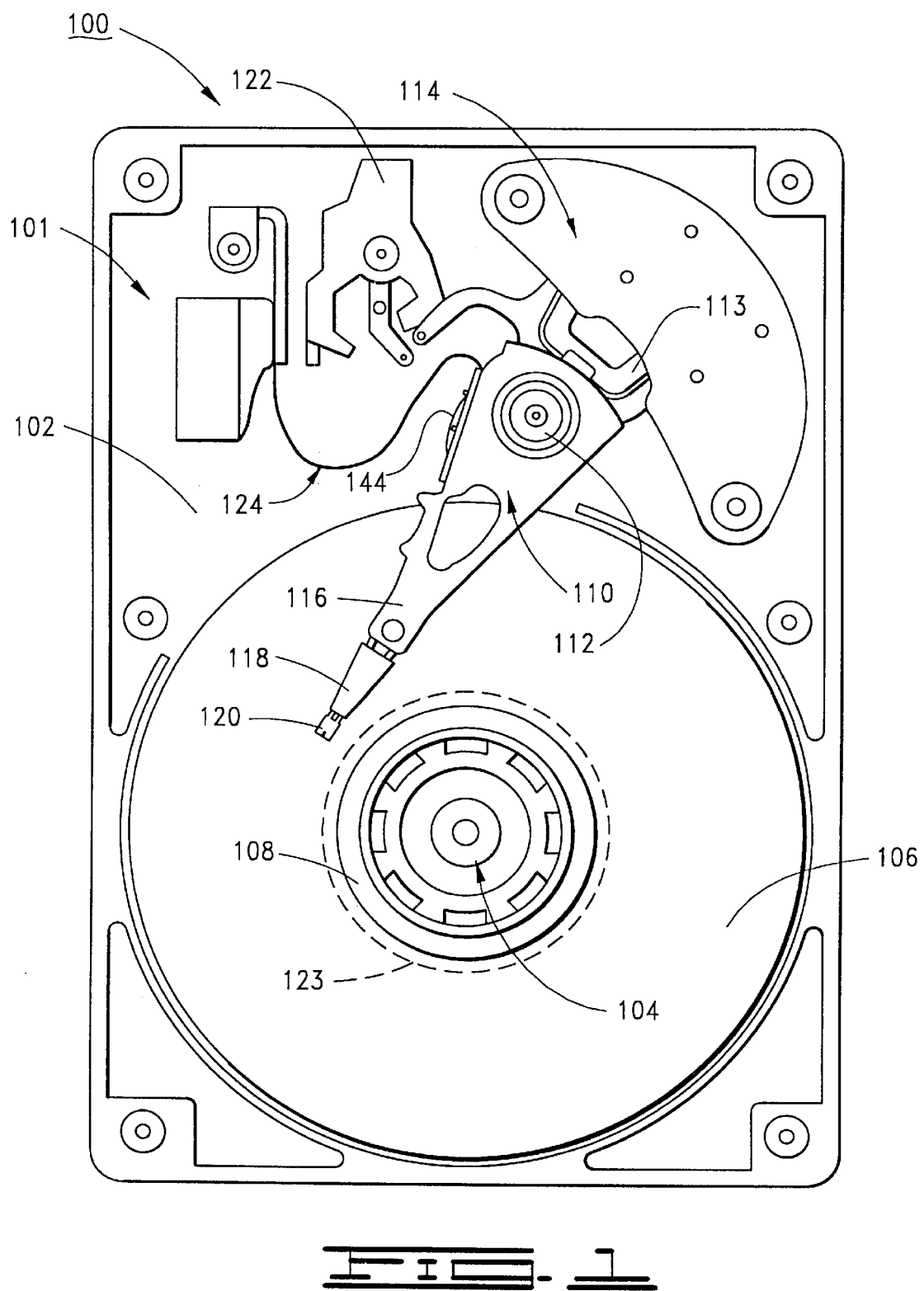
FIG. 1 provides a top plan view of a disc drive constructed in accordance with a preferred embodiment of the present invention.

To provide a detailed discussion of a preferred embodiment of the present invention, reference is now made to the drawings and to FIG. 1 in particular, which shows a top plan view of a disc drive 100. The disc drive 100 includes a head-disc assembly (HDA) 101 and a disc drive printed wiring assembly (PWA) which is mounted to the underside of the HDA 101 and thus, is not visible in FIG. 1. The PWA provides circuitry necessary to control the operation of the HDA 101 and to transfer data between the HDA 101 and a host computer in which the disc drive 100 can be mounted in a user environment.

The HDA 101 includes a base deck 102 to which various disc drive components are mounted. A top cover, which has been omitted from FIG. 1 to facilitate the present discussion, cooperates with the base deck 102 to form an internal, controlled environment for the disc drive 100. A spindle motor 104 is provided to rotate a stack of discs (the topmost of which is denoted at 106) at a constant high speed, with a disc clamp 108 securing the discs to the spindle motor 104.

To access the discs, a controllably positionable actuator assembly 110 is provided which rotates about a cartridge bearing assembly 112 in response to currents applied to a coil (a portion of which is shown at 113) of a voice coil motor (VCM) 114. The actuator assembly 110 includes a plurality of rigid arms from which corresponding flexible suspension assemblies extend, the topmost of which are identified at 116 and 118, respectively. Heads are provided at distal ends of the suspension assemblies and are supported over the discs by air bearings established by air currents set up by the rotation of the discs. The topmost head shown in FIG. 1 is denoted at 120.

A latch assembly 122 is provided to secure the heads over landing zones (denoted at 123) at the innermost diameters of the discs when the disc drive 100 is deactivated. A flex circuit assembly 124 provides electrical communication paths between the actuator assembly 110 and the disc drive PWA.

Figure 2:
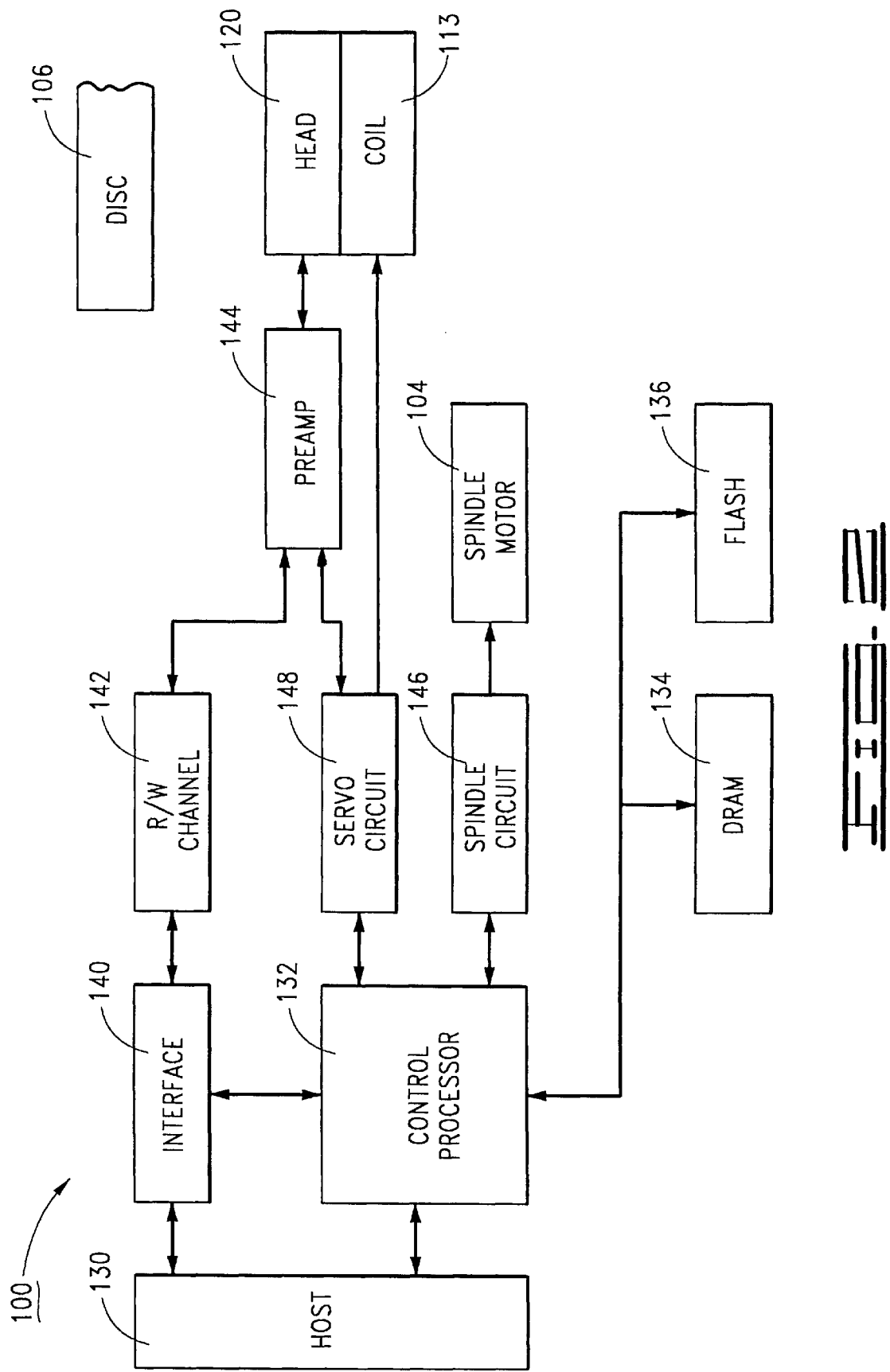
FIG. 2 is a functional block diagram of the disc drive of FIG. 1.

Referring now to FIG. 2, shown therein is a functional block diagram of the disc drive 100 of FIG. 1, in conjunction with a host computer 130 in which the disc drive 100 is contemplated as being mounted. The host computer 130 provides top level control of a disc drive control processor 132, which in turn controls the operation of the disc drive 100 in accordance with programming and parameter values stored in dynamic random access memory (DRAM) 134 and non-volatile flash memory 136.

Data to be stored by the disc drive 100 are transferred from the host computer 130 to an interface circuit 140, which includes a data buffer for temporarily buffering the data and a sequencer for directing the operation of a read/write channel 142 and a preamp/driver circuit 144 ("preamp") during data transfer operations. The preamp 144 is preferably mounted to the actuator assembly 110, as shown in FIG. 1.

Additionally, as is known in the art a spindle circuit 146 is provided to control the rotation of the disc 106 through back electromotive force (bemf) commutation of the spindle motor 104 (FIG. 1). A servo circuit 148 is provided to control the position of the head 120 relative to the disc 106 as part of a servo loop established by the head 120, the preamp 144, the servo circuit 148 and the coil 113. The servo circuit 148 includes a digital signal processor (DSP) and associated memory (not separately shown). The control processor preferably communicates with and controls the operation of the DSP in a manner such as generally set forth by U.S. Pat. No. 5,262,907 issued Nov. 16, 1993 to Duffy et al., assigned to the assignee of the present invention.

Figure 3:
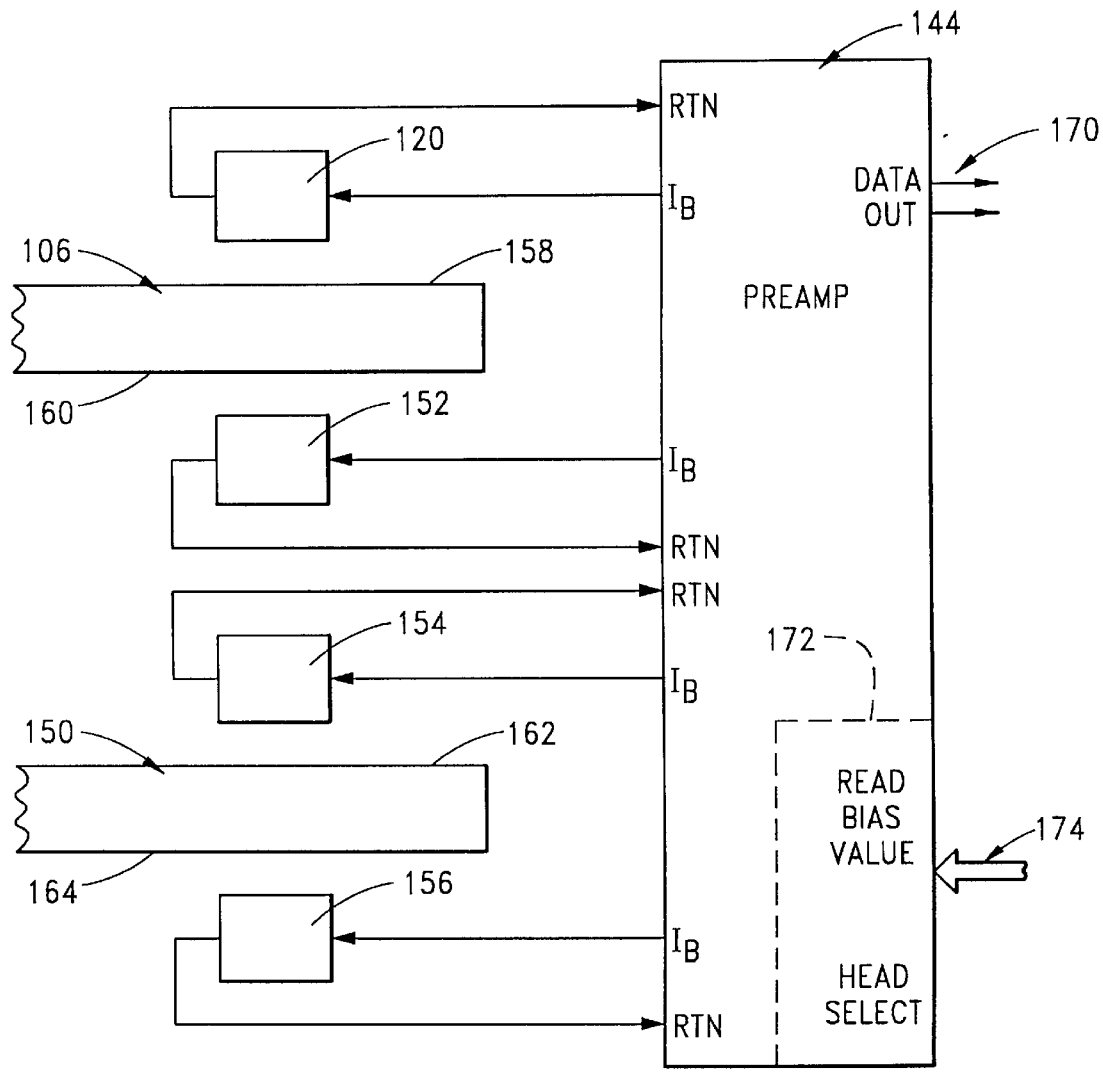
FIG. 3 is a functional block diagram of the preamplifier circuit shown in FIG. 2, in conjunction with a plurality of heads and discs of the disc drive.

FIG. 3 provides a functional block diagram of the preamp 144 of FIG. 2, in conjunction with the topmost head 120 and disc 106 of FIG. 1. FIG. 3 further shows an additional disc 150 and additional heads 152, 154 and 156; it will be readily understood, however, that although two discs 106, 150 have been shown for purposes of the present discussion, the present invention is not so limited. The heads 120, 132 are supported adjacent recording surfaces 158, 160, of the disc 106, and the heads 154, 156 are supported adjacent recording surfaces 162, 164 of the disc 150.

Figure 4:
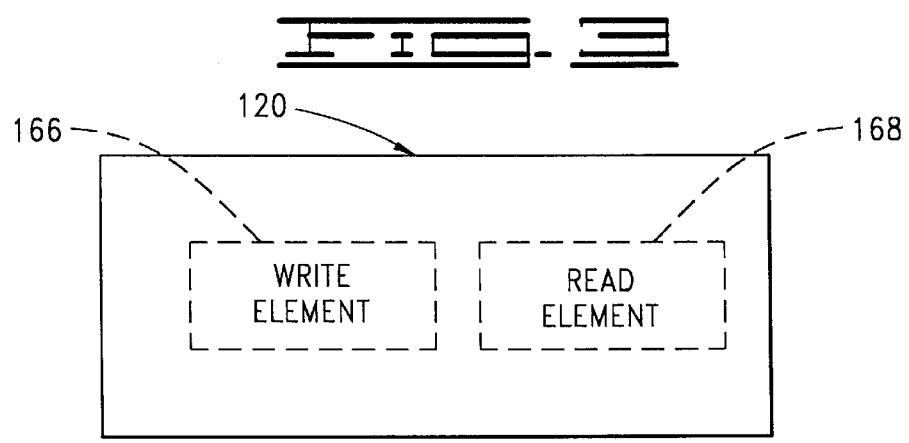
FIG. 4 is a general representation of the head shown in FIG. 2, which is a conventional magneto-resistive (MR) head having a thin-film write element and an MR read element.

The heads 120, 152, 154, 156 are preferably characterized as magnetoresistive (MR) heads, with each head including a conventional thin film write element and MR read element, as generally represented in FIG. 4 at 166, 168 respectively for the head 120. Each MR read element of the disc drive 100 preferably comprises an alloy formed from cobalt, nickel and iron and possesses an electrical resistance that varies when subjected to a magnetic field of a selected orientation. To attain sensitivities necessary to support areal data densities of modern disc drives, each MR read element includes relatively thin boundary layers (typically measured in Angstroms) which are relatively delicate and sensitive to damage. It is thus desirable to hold the common mode potential of all of the MR read elements of each of the heads 120, 152, 154, 156 very closely to that of the discs 106, 150 in order to prevent head-disc electrical discharges (arcing), and to ensure that currents applied to the MR read elements do not exceed the current carrying capabilities of the elements.

Returning again to FIG. 3, as explained more fully below the preamp 144 is used during read and write operations of the disc drive 100 to access data stored on the recording surfaces 158, 160, 162, 164. In doing so, the preamp 144 selectively applies currents to the read and write elements of the heads 120, 152, 154, 156. The preamp 144 preferably incorporates a variety of additional features such as threshold detection, high frequency signal filtering and head selection capabilities as are generally known in the art; for reference, a particularly suitable commercially available preamp is the V10594 from VTC, Inc., of Bloomington, Minn., USA.

Of particular interest to the present discussion is the operation of the preamp 144 during a read operation, during which a read bias current of selected magnitude is continuously applied to the MR read element of the selected head 120, 152, 154, 156. Data stored on the associated recording surface are detected in relation to changes in voltage across the MR read element and reflected in a readback signal output by the preamp 144 to the read/write channel 142 (FIG. 2). In FIG. 3, the readback signal is shown to be transmitted along a DATA OUT path 170, which preferably comprises a pair of signal lines connected to a pair of differential output pins of the preamp 144 (not separately designated).

The magnitudes of the read bias currents (each identified generally as "$I_B$" in FIG. 3) are individually selected for each of the heads 120, 152, 154, 156 during disc drive manufacturing. More particularly, the read bias currents $I_B$ are preferably selected so as to optimize disc drive performance by, for example, writing a selected amount of test data to each of the recording surfaces 158, 160, 162, 164, reading back the data a number of times using a range of magnitudes for the read bias currents $I_B$ and selecting the final magnitudes for the read bias currents $I_B$ in relation to those magnitudes that provide the best read error rates (or other evaluation criteria). The range of magnitudes for the read bias currents $I_B$ are individually determined for each of the heads 120, 152, 154, 156 in a manner that will be discussed in greater detail below.

At this point, however, it will be noted that the magnitudes of the read bias currents $I_B$ are controlled in response to read bias values that are stored in flash memory 136 and sent by the control processor 132 (FIG. 2) to the preamp 144 by way of the DSP of the servo circuit 148. The read bias values are expressed in a multi-bit, digital form and loaded to a selected address of a register (represented by dotted block 172) of the preamp 144 by way of a serial interface path 174. In similar fashion, the various heads 120, 152, 154, 156 are individually selected in response to a multi-bit, digital head select value which is loaded into another address of the register 172 by way of the serial interface path 174. It will be understood that the serial interface path 174 preferably includes a data line along which the read bias and head select values are transmitted, as well as a clock line for supplying a clock to control the reading and writing of the register 172 and an enable line to enable register access. The preamp 144 is contemplated as accommodating up to 10 different heads and facilitating up to 32 different read bias current levels. Each update of the read bias value or the head select value occurs through the sequential clocking of the bits of a 16 bit word having one read/write command bit, seven address bits and eight data bits. The register 172 is thus updated with a new word upon receipt of the $_{16}$h clock pulse.

During normal disc drive operation, one of the heads 120, 152, 154, 156 will be in a selected state (referred to herein as a "presently selected head" or "present head"). The preamp 144 will generally operate to continuously apply the appropriate read bias current to the presently selected head. For example, during a write mode of operation during which the presently selected head is used to write data to a selected track on the associated recording surface 158, 160, 162, 164, the data are written through the selective application of write currents by the preamp 144 to the write element (such as 166 of FIG. 4) of the presently selected head. However, the presently selected head also periodically reads data (such as servo or header information) from the associated recording surface during the write operation to enable the servo circuit 148 to control the position of the presently selected head, necessitating the continued application of the read bias current to the MR read element.

Likewise, the preamp 144 continuously applies the read bias current to the presently selected head during each read operation in order to retrieve the data from the associated recording surface. The actual reading and writing of data occurs while the selected track is followed by the presently selected head, although seeks from one track to the next can also be periodically performed, as a number of different tracks (and even from different recording surfaces 158, 160, 162, 164) can be accessed during a particular read or write operation. After the conclusion of each read and write operation, the servo circuit 148 (FIG. 2) generally operates to cause the presently selected head to continue to follow the most recently accessed track, until the next command is executed by the disc drive 100.

It is therefore desirable that the magnitudes of the read bias currents not exceed the power dissipation capabilities of the heads 120, 152, 154, 156, in order to prevent an inadvertent overbias condition which can adversely affect the operational reliability of the heads. Although the heads 120, 152, 154, 156 are fabricated so as to be nominally identical, process variations will typically result in different nominal resistances for the MR read elements of each head, leading to a different power dissipation capability for each head for a given magnitude of bias current.

Accordingly, FIG. 5 has been provided which shows a generalized flow chart illustrating a MAXIMUM READ BIAS CURRENT MEASUREMENT routine 200, which determines a maximum read bias current that can be applied to each head in accordance with a preferred embodiment of the present invention. It will be understood that the routine is representative of programming stored in the flash memory 136 of FIG. 2 and utilized by the control processor 132 of FIG. 2 at appropriate times, such as during the manufacture of the disc drive 100, when optimum read bias currents are to be identified for subsequent use by the drive.

As shown at block 202, the heads 120, 152, 154, 156 are initially moved over the landing zones associated with each of the heads (such as the landing zone 123 shown in FIG. 1 for the head 120). As will be recognized, the landing zones are texturized locations on the discs 106, 150 where the heads 120, 152, 154, 156 are normally brought to rest (i.e., parked) when the disc drive 100 is deactivated. It will be noted that, unlike a normal parking operation wherein the heads are brought to rest on the landing zones, during the routine of FIG. 5, the spindle circuit 146 (FIG. 2) continues to rotate the spindle motor 104 so that the heads are flown over the landing zones and are not brought to rest thereupon.

Because the landing zones are disposed beyond the recording surfaces 158, 160, 162, 164 and are therefore not magnetized, the heads will not be subjected to magnetic fields sufficient to interfere with the operation of remaining portions of the routine of FIG. 5. The actuator assembly 110 (FIG. 1) can be latched in place using the latch assembly 122, as desired, in order to maintain the heads 120, 152, 154, 156 over the landing zones. It is contemplated that the heads can be alternatively positioned over some other non-recorded portion of the discs 106, 150, so long as the heads are not subjected to magnetic fields from data previously stored to the discs.

It is preferable to fly the heads 120, 152, 154, 156 so as to prevent the possibility of electrically conducting current between the heads and the discs 106, 150. However, in disc drives utilizing ramps to load and unload the heads, it is contemplated that the heads might be parked on the ramps in lieu of flying the heads over non-magnetically recorded portions of the discs, provided the head and ramp configurations prevent the conduction of current from the heads to the ramps. Of course, if the heads are parked on ramps, it will not be necessary to rotate the discs, depending upon the configuration of the drive.

Once the heads 120, 152, 154, 156 are positioned so as to be flown over the landing zones, the routine of FIG. 5 next operates at block 204 to measure a differential offset error voltage $V_O$ across each MR read element of each of the heads. This is preferably accomplished by, for each head in turn, applying a read bias current of selected magnitude to the associated MR read element and measuring the voltage at the data out pins of the preamp 144 (i.e., from the path 170 of FIG. 3). Because the heads 120, 152, 154, 156 are positioned so as to be isolated from the effects of magnetically recorded data, the voltage measured by the preamp 144 should nominally be zero volts. However, due to electrical offsets provided primarily by the preamp 144, it will be recognized that in many cases the offset error voltage $V_O$ will be a non-zero value.

The manner in which the offset error voltage $V_O$ is measured by block 204 can be more fully understood by a review of FIG. 6, which provides a functional schematic diagram of a portion of the disc drive 100 specifically provided for use during the operation of the routine of FIG. 5. It will be readily understood that the circuit set forth by FIG. 6 is preferably switched in during the operation of the routine of FIG. 5, and is therefore not utilized during normal operation of the disc drive 100.

With reference to FIG. 6, during the operation of block 204 of FIG. 5, the preamp 144 applies the selected read bias current to the selected MR read element (which will be considered to be the MR read element 168 of the head 120, as previously shown in FIG. 4) and outputs the voltage detected across the MR read element 168 on the differential output path 170.

Each of the individual signal paths of 170 are operably coupled to a serially connected resistor (denoted at 206, 208, respectively), which in turn are operably coupled to a pair of high input, unity gain buffers 210, 212. For reference, the buffers 210, 212 are commercially available in a single package as the TLC27M7 CMOS DUAL OPERATIONAL AMPLIFIER, Texas Instruments, Dallas, Tex., USA. The buffers 210, 212 serve to isolate the preamp 144 from remaining portions of the circuit of FIG. 6 and provide reasonable bandwidth and substantially high input impedance. The resistors 206, 208 provide capacitive isolation for the buffers and are preferably rated at 100 kilo-ohms (kohms) each.

The buffers 210, 212 are operably coupled to a conventional differential amplifier circuit 214, comprising an operational amplifier 216 and resistors 218, 220, 222 and 224. For reference, the resistors 218, 220 are preferably rated at 9 kohms each and the resistors 222, 224 are preferably rated at 8 kohms each. A suitable reference voltage $V_{REF}$ of 2.2 volts is supplied by a reference voltage source 226.

The output from the differential amplifier circuit 214 is provided on path 228 as a voltage indicative of the differential voltage output by the preamp 144 on the signal paths of 170, with path 228 being connected to an analog-to-digital (A/D) converter 230. The A/D 230 converts the input voltage to digital form and outputs the same on digital path 232, which can be thereafter be accessed by the control processor 132 of FIG. 2.

Referring back to FIG. 5, the operation of block 204 utilizes the circuit of FIG. 6 to obtain the offset error voltage $V_O$ values for each of the heads 120, 152, 154, 156 in turn. Preferably, multiple measurements are made for each of the heads and these multiple measurements are averaged to obtain a final $V_O$ value for each of the heads. Moreover, voltage measurements are preferably obtained for each of a series of initial bias currents of incrementally increasing value, as graphically illustrated in FIG. 7.

More particularly, FIG. 7 provides a graphical representation of a response curve 234 plotted against an x-axis 233 indicative of applied bias current and a y-axis 235 indicative of correspondingly measured voltage. As mentioned above, the preamplifier circuit 144 can preferably output a total of 32 different read bias current magnitudes which are identified from 0 to 31 along the x-axis 233 of FIG. 7. It is contemplated that during the operation of block 204 of FIG. 5, for each head in turn, a succession of read bias currents are applied to the head beginning with the lowest current (current value 0), with the resulting voltage measurement ($V_O$) being recorded for each. The voltage response such as set forth by curve 234 will be somewhat non-linear, due to the fact that the MR element will tend to heat up over time as read bias currents having magnitudes that increase by a selected, incremental amount are applied to the element.

Finally, it will be noted that the preamp 144 is configured in a "normal" mode of operation during block 204, so that the measured voltage offsets $V_O$ generally correspond to a normal readback signal output by the preamp in the absence of magnetic flux transitions from the corresponding disc. Although various constructions are available for preamp circuits such as 144, the result of the operation of block 204 can be thought of as being generally similar to the application of a high pass filter to the readback signal so as to enable detection of frequency components within a range of interest (i.e., the frequency at which data are normally written to the discs). Hence, the absence of flux transitions should provide a baseline signal having a magnitude ($V_O$) indicative of preamp offset.

Returning again to the routine of FIG. 5, the flow next passes from block 204 to block 236, wherein the disc drive 100 next measures an apparent direct current (DC) voltage $V_A$ for each of the heads 120, 152, 154, 156. More particularly, the same selected bias currents are again applied to each of the heads 120, 152, 154, 156 in turn, and the DC voltages thereacross are measured. Using the above mentioned analogy, the operation of block 236 can be thought of as being similar to the determination of voltage measurements in the absence of any high frequency filtering.

The voltages $V_A$ obtained by the operation of block 236 are referred to as "apparent" DC voltages, in that the offset error voltage $V_O$, introduced primarily by the operation of the preamp 144, will be present in each corresponding voltage $V_A$ obtained by the operation of block 236, and therefore should be subtracted out to determine an actual DC voltage, as explained below. For reference, the previously mentioned VTC V10594 preamp has a special selectable test mode which enables this $V_A$ measurement to be obtained. However, it will be noted that some commercially available preamplifiers have the capability of providing the actual DC voltage across an MR read element directly, without the necessity of separately determining an offset error and an apparent DC voltage, as set forth by the flow of FIG. 5. Finally, it will be understood that the voltages $V_A$ are likewise preferably determined for each of a succession of read bias currents, such as discussed above with reference to FIG. 7.

Once the apparent DC voltage $V_A$ has been determined for each of the heads 120, 152, 154, 156, the routine of FIG. 5 passes from block 236 to block 238, wherein the routine determines a maximum read bias current that can be applied to each of the heads 120, 152, 154, 156. This is accomplished from the following relationship:

$$P_{RATED} = (V_A - V_O) I_{MAX} k \qquad (1)$$

where $P_{RATED}$ is the specified maximum power dissipation rating of the MR read elements of the heads, $V_A$ is the apparent DC voltage determined by block 236 for each of the heads, $V_O$ is the offset error voltage determined by block 204 for each of the heads, $I_{MAX}$ is the maximum read bias current that can be applied to the MR read elements of each of the heads and k is a derating factor (such as 0.9) used to provide a derating margin to account for measurement inaccuracies. As discussed above, the maximum read bias current $I_{MAX}$ will typically be different for each of the MR read elements of each of the heads 120, 152, 154, 156, due to variations in nominal resistance therebetween. Moreover, $P_{RATED}$ will be established by the construction of the head; a typical value is around 5.2 milliwatts (mW).

The operation of block 238 of FIG. 5 operates to determine the maximum read bias current $I_{MAX}$ for each of the heads 120, 152, 154, 156, using the following relationship:

$$P_{ACTUAL} = (V_A - V_O) I_{ACTUAL} k \qquad (2)$$

so that the $V_A$ and $V_O$ values corresponding to each of the read bias currents $I_{ACTUAL}$ are used to determine the actual power $P_{ACTUAL}$ dissipated by the head. More particularly, during the operation of block 238, for each head, the read bias current corresponding to current 0 (FIG. 7) is first multiplied by the difference of the corresponding $V_A$ and $V_O$ values obtained by blocks 204 and 236, respectively, as well as multiplied by the derating factor k to arrive at a $P_{ACTUAL}$ value for current 0, which is then compared to the $P_{RATED}$ value for the head. When $P_{ACTUAL}$ is less than $P_{RATED}$, the routine continues with the $V_A$ and $V_O$ values obtained for the next read bias current and so on until the particular current value that provides a $P_{ACTUAL}$ value that is the closest to $P_{RATED}$, without exceeding $P_{RATED}$, is found. Accordingly, this particular current value is identified as the maximum read bias current $I_{MAX}$ for that head and is stored in memory (such as the DRAM 134 of FIG. 2). Once $I_{MAX}$ values have been determined for each of the heads, the routine ends at 240.

Although the routine of FIG. 5 shows the sequential identification of $V_O$ and $V_A$ values for each of the heads (blocks 204 and 236), followed by the identification of the maximum read bias current $I_{MAX}$ at block 238, it will be recognized that, alternatively, a single head can be selected at a time and optimized. That is, it is contemplated that the head 120 could first be selected, after which a read bias current corresponding to current 0 (FIG. 7) is applied to the head and $V_A$ and $V_O$ values are obtained, after which the $P_{ACTUAL}$ value could be determined in accordance with equation (2) and compared to $P_{RATED}$ as discussed above. When $P_{ACTUAL}$ is less than $P_{RATED}$, the routine would continue with the incrementing of the applied current to current 1 (FIG. 7) and a determination of a new $P_{ACTUAL}$ based on the resulting $V_A$ and $V_O$ values.

In this manner, read bias currents could be incrementally applied to each head in turn, with no need to apply further read bias currents (and obtain voltage measurements) once the read bias current that provides $P_{ACTUAL}$ that is closest to PRATED without exceeding $P_{RATED}$ is identified. Another advantage with this alternative approach is that the risk of applying excessively high read bias currents to the heads is minimized. It will be clearly understood, however, that these and various other related approaches are contemplated as being well within the spirit and scope of the claimed invention as set forth below.

Having concluded the foregoing discussion of FIGS. 5–7 whereby the maximum bias currents $I_{MAX}$ are determined for each head, the manner in which the disc drive 100 proceeds to use these $I_{MAX}$ values to optimize the read bias currents for each of the heads will now be discussed with reference to FIG. 8. More particularly FIG. 8 set forth a READ BIAS CURRENT OPTIMIZATION routine 250, set forth in FIG. 8. As with the routine of FIG. 6, the routine of FIG. 8 is representative of programming stored in the flash memory 136 and utilized by the control processor 132 at appropriate times, such as during disc drive manufacturing, in accordance with a preferred embodiment of the present invention.

With reference to FIG. 8, the routine selects the first head to be optimized (such as the head 120) in block 252. Next, the $I_{MAX}$ value for the selected head is recalled from memory, block 254, and a range of read bias currents are determined therefrom, block 256. As discussed above, the preamp 144 preferably accommodates up to 32 different read bias current levels of increasing magnitude and the $I_{MAX}$ value establishes an upper limit on the range of values selected by block 256.

The values selected by block 256 are thereafter used during the operation of block 258 to find an optimum bias current for the selected head. As mentioned hereinabove, it is common during disc drive optimization procedures to select a number of bias current values (such as, for example, eight) of increasing magnitude, and to in turn evaluate the effects of each of the various bias current values in terms of a selected acceptance criteria, such as the bias current value providing the minimum read error rate.

Accordingly, it is contemplated that the range of values selected by block 256 will preferably comprise a total of eight read bias current values, and these values will be selected to substantially uniformly cover the range between the minimum read bias current value that can be selected up to the maximum read bias current value $I_{MAX}$ determined by the routine of FIG. 5. In this manner, the possibility of overbiasing any particular one of the heads 120, 152, 154, 156 will be eliminated because the range of bias currents selected by block 256 and evaluated by block 258 will fall within the maximum read bias current $I_{MAX}$ for each head.

Moreover, the actual range of read bias currents selected by block 256 and used by block 258 will be individually tailored to each head, thereby allowing those heads capable of accommodating a relatively larger amount of bias current to be safely evaluated using such higher current levels. Because a general correlation has been observed between higher read bias currents and higher signal to noise ratios in recovered readback signals, the use of read bias currents of greater magnitude will in many cases likely allow disc drive manufacturers to achieve better levels of operational performance.

Returning to FIG. 8, once the optimal read bias current $I_B$ has been determined for the selected head, the routine passes from block 258 to decision block 260, wherein the routine determines whether all of the heads 120, 152, 154, 156 have been optimized. If not, the routine passes to block 262 wherein the next head is selected and the routine returns back to block 254. Accordingly, once all of the heads 120, 152, 154, 156 have been optimized, the routine ends at block 264, as shown.

From the foregoing discussion it will now be clear that the present invention is directed to an apparatus and method for optimizing magnitude of a bias current applied to a head (such as 120, 152, 154, 156) of a disc drive (such as 100). The head is disposed adjacent a rotatable disc (such as 106, 150) having a recording surface (such as 158, 160, 162, 164) on which data are magnetically stored. A preamplifier circuit (such as 144) selectively applies bias currents to the head in response to a head bias current selection circuit (such as 132).

In order to optimize the magnitude of the bias current, the maximum magnitude that can be safely applied to the head is first determined. This is accomplished by measuring a voltage across the head in response to the application of an initial bias current of selected magnitude (such as by 204, 234). The maximum magnitude of bias current is next determined in relation to the voltage measured across the head and a maximum power dissipation rating of the head (such as by 238).

To optimize the magnitude of the bias current, a range of bias currents is identified (such as by 256) comprising a plurality of bias currents of different magnitudes, each magnitude being equal to or less than the previously determined maximum magnitude of bias current. Each of the plurality of bias currents of the range of bias currents is then sequentially applied to the head and the resulting performance of the disc drive is evaluated (such as by 258), with the optimum magnitude of the bias current being selected therefrom on the basis of that magnitude of bias current providing optimum disc drive performance.

For purposes of the following claims, it will be understood that the term "bias current" comprises a current that is applied to a head to facilitate the operation of the head, such as the read bias current discussed hereinabove with respect to magneto-resistive heads. However, other types of heads utilizing bias currents, such as giant magneto-resistive (GMR), spin valve heads, and the like are also contemplated as being readily within the spirit and scope of the claimed invention. Further, the use of the term "circuit" will be readily understood to cover both hardware and firmware implementations, such as with a programmable processor (i.e., the control processor 132) disclosed herein. Finally, it will be understood that although certain method claims show an ordering of steps, the scope of the claims are not necessarily limited to the ordering of the steps presented therein.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for optimizing magnitude of a bias current applied to a head of a disc drive, comprising steps of:
   (a) measuring a voltage across the head while applying an initial bias current of selected magnitude to the head;
   (b) determining a maximum magnitude of a bias current that can be safely applied to the head in relation to the voltage measured in step (a) and a maximum power dissipation rating of the head;
   (c) determining a range of bias currents having different magnitudes, each magnitude being equal to or less than the maximum magnitude;
   (d) identifying an optimum magnitude of the bias current by sequentially applying the range of bias currents to the head and evaluating performance of the disc drive for each of the range of bias currents; and, thereafter,
   (e) using the optimum magnitude of the bias current during operation of the head.

2. The method of claim 1, wherein the disc drive comprises a plurality of heads, and wherein steps (a) through (e) are performed for each of the plurality of heads so that an optimum magnitude of a bias current is obtained for each of the plurality of heads.

3. The method of claim 1, wherein step (a) comprises application of a plurality of initial bias currents having incrementally increasing magnitudes, and wherein the maximum magnitude determined by step (b) is selected from the plurality of initial bias currents.

4. The method of claim 1, wherein the disc drive comprises a rotatable disc having a recording surface to which data are magnetically stored, wherein the data can be detected by the head during a read operation, and wherein step (a) further comprises positioning the head over a remaining portion of the disc beyond the recording surface so that the magnetically stored data are not detected by the head.

5. The method of claim 3, wherein the remaining portion of the disc comprises a landing zone upon which the head comes to rest when the disc drive is deactivated, and wherein the head is flown over the landing zone during step (a).

6. The method of claim 1, wherein the disc drive comprises a preamplifier circuit which is operably coupled to the head and applies the initial bias current to the head, the preamplifier circuit outputting a differential voltage indicative of the voltage across the head in response to the initial bias current.

7. The method of claim 6, wherein the disc drive further comprises an analog-to-digital converter operably coupled to the preamplifier circuit, which outputs a digitally expressed value indicative of the differential voltage output by the preamplifier circuit.

8. The method of claim 7, wherein the disc drive further comprises a buffer operably coupled to and disposed between the preamplifier circuit and the analog-to-digital converter, which electrically isolates the preamplifier circuit from the analog-to digital converter.

9. The method of claim 1, wherein the disc drive comprises a preamplifier circuit which applies the initial bias current to the head, wherein the voltage measured by step (a) comprises an actual direct current voltage across the head, and wherein step (a) further comprises steps of:
   (a1) measuring an offset error voltage across the head indicative of electrical offset introduced by the preamplifier circuit;
   (a2) measuring an apparent direct current voltage across the head by applying a low pass filter to voltage measured across the head; and (a3) determining the actual direct current voltage in relation to the difference between the apparent direct current voltage and the offset error voltage.

10. The method of claim 1, wherein the maximum magnitude of the bias current determined in step (b) is further determined in relation to a derating factor.

11. A disc drive, comprising:

a head disposed adjacent a rotatable disc having a recording surface on which data are magnetically stored;

a preamplifier circuit, operably coupled to the head, which selectively applies bias currents to the head; and a head bias current selection circuit, operably coupled to the preamplifier circuit, which optimizes a magnitude of a bias current by determining a maximum magnitude of the bias current that can be applied to the head in relation to maximum power dissipation rating of the head and a voltage measured across the head when a bias current of selected magnitude is applied to the head.

12. The disc drive of claim 11, wherein the head bias current selection circuit comprises a control processor having associated programming.

13. The disc drive of claim 11, wherein the head bias current selection circuit sequentially applies a series of bias currents having selected magnitudes of increasing value, measures a corresponding voltage across the head in response to each of the series of bias currents, and selects the maximum magnitude of the bias current from the selected magnitudes of the series of bias currents.

14. The disc drive of claim 11, wherein the head bias current selection circuit further determines a range of bias currents having different magnitudes, each magnitude being equal to or less than the maximum magnitude and identifies an optimum magnitude of the bias current by sequentially applying the range of bias currents to the head and evaluating performance of the disc drive for each of the range of bias currents.

15. The disc drive of claim 11, wherein the disc drive comprises a plurality of heads, and wherein the head bias current selection circuit identifies an optimum magnitude of a bias current for each of the plurality of heads.

16. The disc drive of claim 11, wherein the data can be detected by the head during a read operation, and wherein the head bias current selection circuit positions the head over a remaining portion of the disc beyond the recording surface so that the magnetically stored data are not detected by the head when the bias current of selected magnitude is applied to the head.

17. The disc drive of claim 16, wherein the remaining portion of the disc comprises a landing zone upon which the head comes to rest when the disc drive is deactivated, and wherein the head is flown over the landing zone when the bias current of selected magnitude is applied to the head.

18. The disc drive of claim 11, wherein the disc drive further comprises an analog-to-digital converter operably coupled to the preamplifier circuit, which outputs a digitally expressed value indicative of a differential voltage output by the preamplifier circuit.

19. The disc drive of claim 18, wherein the disc drive further comprises a buffer operably coupled to and disposed between the preamplifier circuit and the analog-to-digital converter, which electrically isolates the preamplifier circuit from the analog-to digital converter.

* * * * *

UNITED STATES PATENT AND TRADEMARK OFFICE
CERTIFICATE OF CORRECTION

PATENT NO. : 6,115,201
DATED : September 5, 2000
INVENTOR(S) : Karl Louis Enarson, Deanne Sue Grover, Hieu Van Nguyen and John Michael Baker It is certified that error appears in the above-identified patent and that said Letters Patent is hereby corrected as shown below:

<u>Column 5,</u>
Line 64, replace "$_{16}$h" with -- $16^{th}$ --

<u>Column 10,</u>
Line 13, replace "PRATED" with -- $P_{RATED}$ --.

Signed and Sealed this

Seventh Day of May, 2002

Attest:

JAMES E. ROGAN
*Attesting Officer*     *Director of the United States Patent and Trademark Office*